United States Patent
Ffrench et al.

(10) Patent No.: US 9,747,250 B2
(45) Date of Patent: Aug. 29, 2017

(54) EFFECTIVE MEMORY MANAGEMENT FOR HOST OBJECTS IN A RUNTIME ENVIRONMENT WITH EMBEDDED GARBAGE-COLLECTED BASED DYNAMIC LANGUAGE

(71) Applicant: International Business Machines Corporation, Armonk, NY (US)

(72) Inventors: Tony Ffrench, Medford, MA (US); Libra C. Huang, Taipei (TW); Mei-Jiuang Juang, New Taipei (TW); Timothy J. Smith, Raleigh, NC (US); Chih-Wen Su, Taipei (TW); Yi-hong Wang, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 246 days.

(21) Appl. No.: 14/667,864

(22) Filed: Mar. 25, 2015

(65) Prior Publication Data
US 2016/0283437 A1    Sep. 29, 2016

(51) Int. Cl.
*G06F 15/167* (2006.01)
*H04L 29/08* (2006.01)
(52) U.S. Cl.
CPC .......... *G06F 15/167* (2013.01); *H04L 29/08* (2013.01)
(58) Field of Classification Search
CPC .............................. G06F 15/167; H04L 67/142
See application file for complete search history.

(56) References Cited

U.S. PATENT DOCUMENTS 6,279,148 B1    8/2001    Taivalsaari et al.
6,604,182 B1    8/2003    Sexton et al.
(Continued)

FOREIGN PATENT DOCUMENTS

DE    102008036479    11/2010
EP    940755    8/1999

OTHER PUBLICATIONS

Wilson, Paul R., Mark S. Johnstone, Michael Neely, and David Boles. "Dynamic storage allocation: A survey and critical review." in Memory Management, pp. 1-116. Springer Berlin Heidelberg, Sep. 1995.
(Continued)

*Primary Examiner* — Brian J Gillis
*Assistant Examiner* — Amy Ling
(74) *Attorney, Agent, or Firm* — Patterson + Sheridan, LLP

(57) ABSTRACT

A system for improving memory management in a hybrid programming environment where a server program receives a request to execute a script. The server program instructs an embedded script engine to execute the script. The server program creates a session manager to manage objects associated with the script. The objects are comprised of host objects that reside in a program memory space, and script objects that reside in an embedded script engine memory space. The session manager creates a session associated with the execution of the script, and associated objects created during the execution of the script. Upon receiving notification of completion and/or termination of the execution of the script, the server program requests invalidation and/or deletion of the objects associated with the session. Deletion of host objects immediately releases memory in the program memory space without waiting for the scheduled garbage collection.

20 Claims, 4 Drawing Sheets

(56) References Cited

U.S. PATENT DOCUMENTS

| | | | |
|---|---|---|---|
| 6,629,113 | B1 | 9/2003 | Lawrence |
| 7,937,419 | B2 | 5/2011 | Ylonen |
| 8,001,336 | B2 | 8/2011 | Markova et al. |
| 2007/0162528 | A1 | 7/2007 | Wright et al. |
| 2008/0215826 | A1* | 9/2008 | Markova .............. G06F 9/5016 711/154 |
| 2009/0327372 | A1 | 12/2009 | Ylonen |
| 2010/0281217 | A1* | 11/2010 | Sundarrajan ......... H04L 69/329 711/118 |
| 2011/0247000 | A1 | 10/2011 | Eidus et al. |
| 2013/0246417 | A1 | 9/2013 | Seth et al. |
| 2014/0047209 | A1 | 2/2014 | Pizlo et al. |
| 2015/0143348 | A1* | 5/2015 | You .......................... G06F 8/37 717/146 |

OTHER PUBLICATIONS

Chen, Gu, R. Shetty, M. Kandemir, Narayanan Vijaykrishnan, Mary Jane Irwin, and Mario Wolczko. "Tuning garbage collection in an embedded Java environment." in High-Performance Computer Architecture, 2002. Proceedings. Eighth International Symposium on, pp. 92-103. IEEE, Nov. 2002.

Anonymous, Garbage collection (computer science), http://en.wikipedia.org/wiki/Garbage_collection_(computer_science); [retrieved Mar. 16, 2015].

* cited by examiner

EFFECTIVE MEMORY MANAGEMENT FOR HOST OBJECTS IN A RUNTIME ENVIRONMENT WITH EMBEDDED GARBAGE-COLLECTED BASED DYNAMIC LANGUAGE

BACKGROUND

In a hybrid programming environment, such as a server program with an embedded script engine, scripts (for example, JavaScript) are executed. During execution, host objects and script objects are created. When the script either completes execution or terminates, the host objects and script objects are deleted only when a scheduled memory management mechanism, such as a garbage collector, is periodically run. Until the scheduled memory management mechanism runs, memory associated with the host objects and script objects remains unavailable to the server program even though the programming environment no longer requires those objects. The server program has no knowledge of objects that are no longer referenced/required by the embedded script engine. Therefore, it would be helpful for the server program to know when objects, in particular, host objects, are no longer referenced by the embedded script engine so that the server program may immediately delete those objects to free up space within the programming environment.

SUMMARY

According to an embodiment disclosed herein, in a method for improving memory management in a hybrid programming environment, the method receives a request to execute a script. A server program receives the request. The server program instructs an embedded script engine to execute the script. The server program creates a session manager to manage objects associated with execution of the script, where the objects are comprised of host objects and script objects. The host objects reside in a program memory space, and the script objects reside in an embedded script engine memory space. The session manager creates a session associated with the execution of the script. Objects that are created during the execution of the script are associated with the session. Upon receiving notification of completion or termination of the execution of the script, the server program requests invalidation and/or deletion of the objects associated with the session. The immediate deletion of host objects immediately releases memory in the program memory space without waiting for a scheduled memory management mechanism performed by the embedded script engine.

In one aspect of embodiments disclosed herein, when the server program creates the session manager, the method maintains the session manager on the server program.

In one aspect of embodiments disclosed herein, when the session manager creates a session associated with the execution of the script, the session manager script may add a host object or script object to the session during execution of the script. The session manager may also maintain a reference link between the script object and the host object in the session.

In one aspect of embodiments disclosed herein, when the session manager creates a session, the session manager maintains a hierarchy of sessions. When the execution of the script invokes another script, a sub session is created for objects associated with the other script. The session manager maintains the sub session within the session.

In one aspect of embodiments disclosed herein, when the session manager creates a session, the method maintains the session in a session data structure residing on the program memory space.

In one aspect of embodiments disclosed herein, when the method receives notification of completion or termination of the execution of the script, the session manager iterates through the objects associated with the session to remove a reference link from a script object to a host object, invalidate the script object, and mark the script object as eligible for the scheduled memory management mechanism. The session manager then immediately deletes the host object. The session manager may also remove the script and/or host object from the session.

In one aspect of embodiments disclosed herein, when the method receives notification of completion or termination of the execution of the script, the session manager sequentially deletes the objects associated with the session and/or a sub session associated with the session. The sub session is created for objects associated with at least one other script invoked by the script, where the session manager maintains the sub session within the session.

System and computer program products corresponding to the above-summarized methods are also described and claimed herein.

DETAILED DESCRIPTION

Figure 1:
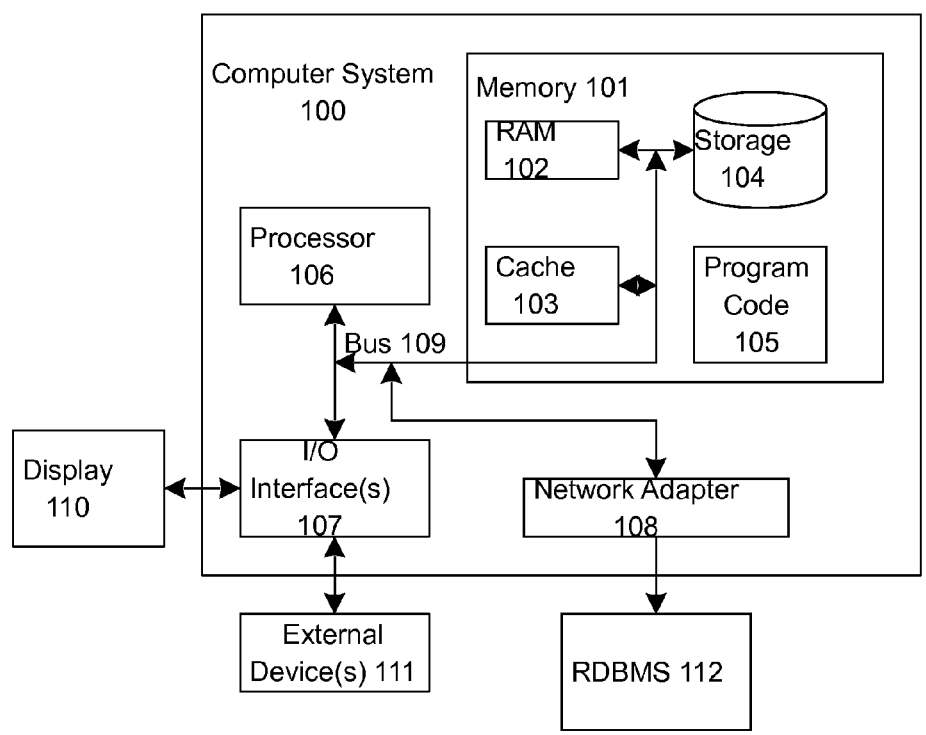
FIG. 1 illustrates an embodiment of a system for improving memory management in a hybrid programming environment, according to embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a system for improving memory management in a hybrid programming environment according to embodiments disclosed herein. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more networks via network adapter 108. The computer system 100 may communicate with one or more databases 112 via network adapter 108.

Figure 2:
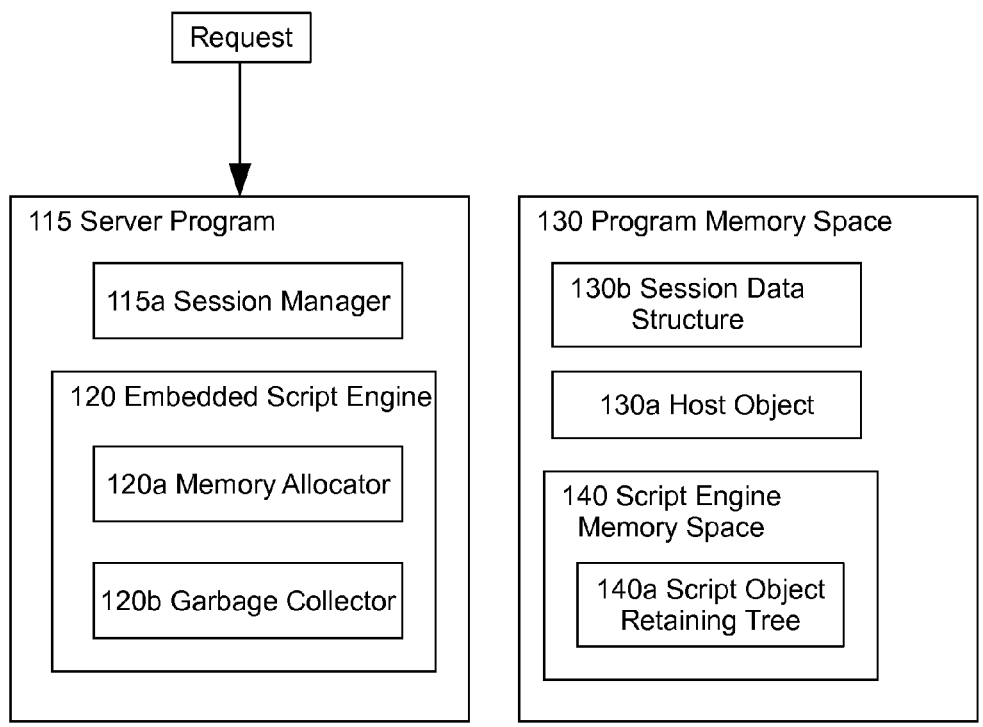
FIG. 2 illustrates an example hybrid programming environment with an embedded script engine using a session manager for improved memory management, according to embodiments disclosed herein.

FIG. 2 illustrates an example hybrid programming environment with an embedded script engine using a session manager for improved memory management. The server program 115 may receive a request that may contain a script (such as JavaScript code) to be executed. The server program 115 is started with an allocated program memory space 130. The server program 115 initializes the embedded script engine 120. This results in reserving the embedded script engine memory space 140, which is solely managed by the embedded script engine 120. The server program 115 creates a session manager 115a when the server program 115 instructs the embedded script engine to execute a script. When the server program 115 creates host objects and script objects, the server program 115 pushes those objects into the session. The session data structure 130b resides in the program memory space 130. When embedded script engine 120 executes a script, the memory allocator 120a creates script objects in the embedded script engine memory space 140, and may link the script objects to host objects. Script objects are stored in the script object retaining tree 140a. Periodically, the garbage collector 120b is run to delete script objects and host objects.

Figure 3:
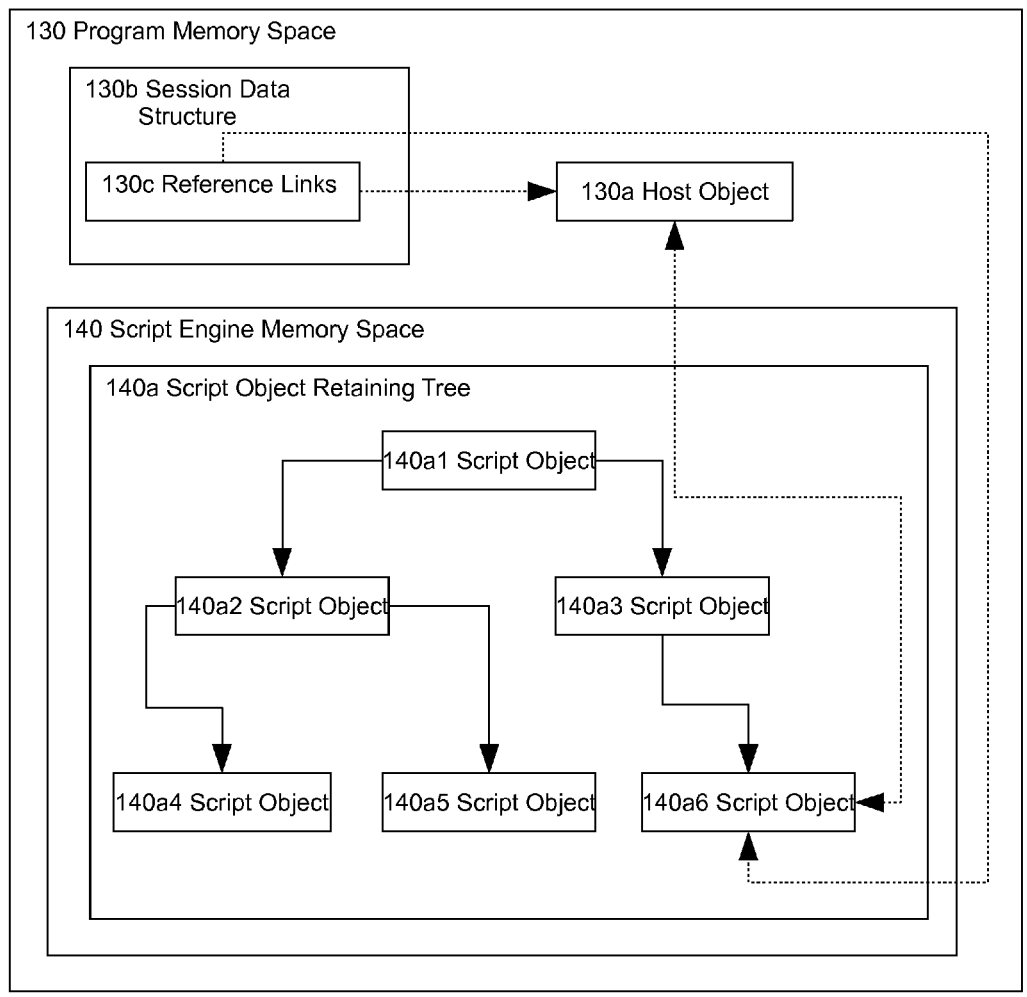
FIG. 3 illustrates an example program memory space of a hybrid programming environment using a session manager for improved memory management, according to embodiments disclosed herein.

FIG. 3 illustrates an example program memory space of a hybrid programming environment using a session manager 115a for improved memory management. The session data structure 130b is stored within the program memory space 130. The session data structure 130b keeps track of a host object 130a and a script object 140a6 that are created during execution of a script (although any number of host objects and script objects may be created during execution of a script, and while the server program 115 is running). The session data structure 130b also maintains reference links 130c between host objects and script objects. In this example, there is a reference link between host object 130a and script object 140a6. The embedded script engine memory space 140 maintains the script object retaining tree 140a. When the script creates objects during execution, the memory allocator 120a allocates memory from the embedded script engine memory space 140, and adds a corresponding node to the script object retaining tree 140a. In this example script object 140a1 holds references to script object 140a2 and script object 140a3. Script object 140a2 holds references to script object 140a4 and 140a5. Script object 140a3 holds a reference to script object 140a6.

Figure 4:
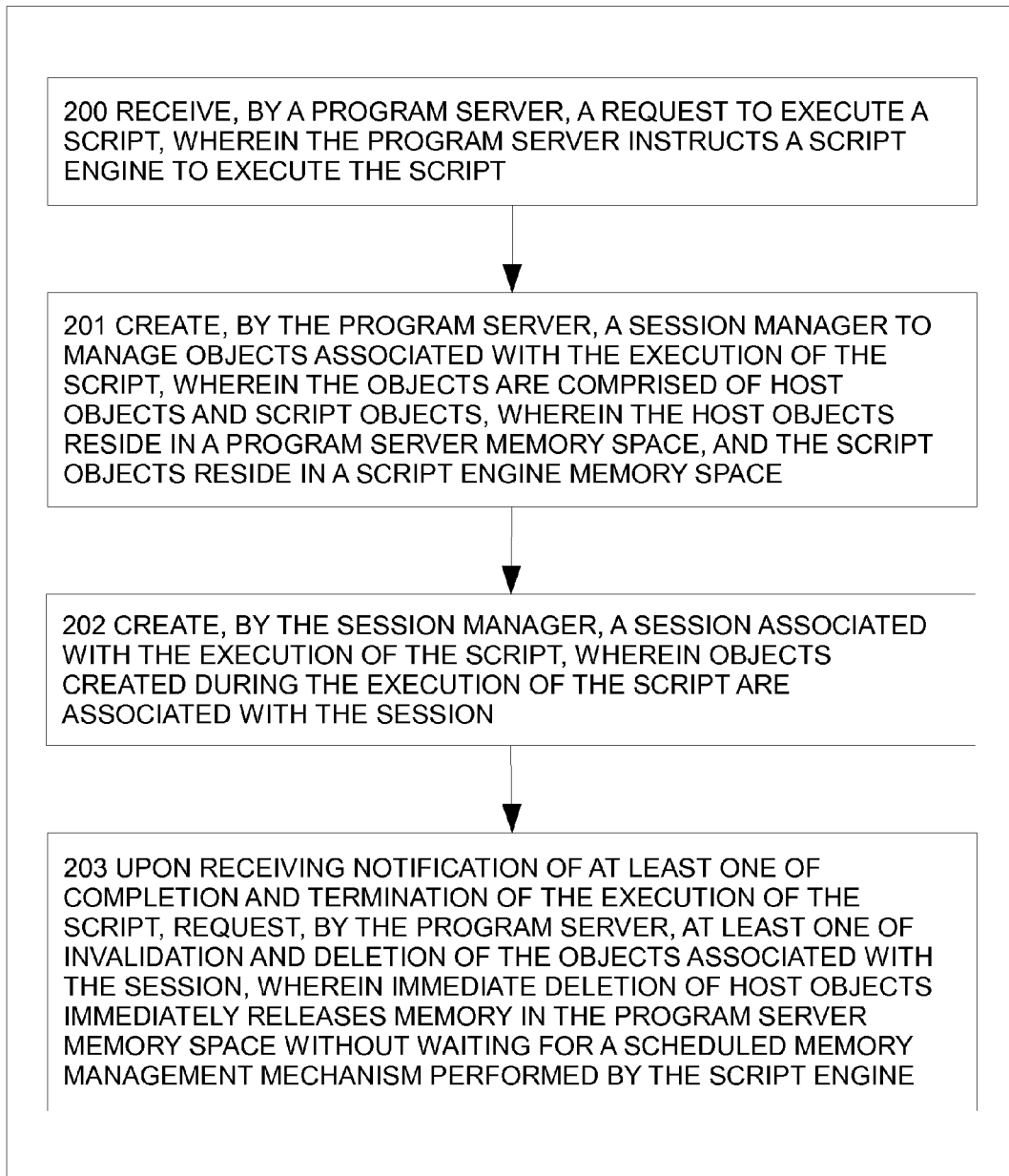
FIG. 4 is a flowchart illustrating an embodiment of a method for improving memory management in a hybrid programming environment, according to embodiments disclosed herein.

FIG. 4 illustrates an embodiment of a method for improving memory management in a hybrid programming environment. At 200, the method, via the computing processor 106, receives a request to execute a script. The server program 115 receives the request, and instructs an embedded script engine 120 to execute the script. In an example embodiment, the server program 115 is built using a programming language, such as C, C++, etc. The server program 115 embeds an embedded script engine 120 that enables the server program 115 to run scripts supported by the embedded script engine 120. The scripts are typically written in dynamic programming languages such as JavaScript, ActiveScript, VBScript, etc. As the server program 115 runs and the scripts are executed, objects (i.e., host objects and script objects) are created. The dynamic programming languages typically use garbage collection as a memory management mechanism. A garbage collector 120b is run periodically to delete the host objects and script objects that are no longer needed. The amount of memory allocated for these objects increases and decreases based on when the garbage collector 120b is run. Until the garbage collector 120b is run, the memory allocated for those host objects and script objects is not available to the programming environment even though those host objects and script objects are no longer needed. The server program 115 cannot arbitrarily free the memory of host objects referenced by the embedded script engine 120 since the server program 115 has no knowledge regarding at what point those host objects are no longer referenced by the script engine 120.

At 201, the server program 115 creates a session manager 115a to manage objects associated with the execution of the script. The objects are comprised of host objects and script objects. The host objects reside in a program memory space 130, and the script objects reside in the embedded script engine memory space 140. In an example embodiment, when the server program 115 instructs the embedded script engine 120 to execute a script, the server program 115 also creates a session manager 115a to manage the objects associated with that script.

At 202, the session manager 115a creates a session associated with the execution of the script. The objects created during the execution of the script are associated with the session. In an example embodiment, the session manager 115a may create an application session for the server program 115. There are host objects and script objects that run during the lifecycle of the server program 115. The server program 115 creates these objects and pushes them onto the application session. When the server program 115 instructs the embedded script engine 120 to execute a script, the session manager 115a creates a script session nested in the application session. As the script executes, the server program 115 creates host objects and script objects, and pushes these host objects and script objects onto the script session.

At 203, upon receiving notification of at least one of completion and termination of the execution of the script, the server program 115 requests invalidation and/or deletion of the objects associated with the session. The immediate deletion of host objects immediately releases memory in the program memory space 130 without waiting for a scheduled memory management mechanism performed by the embedded script engine 120. In an example embodiment, when a script completes execution, or terminates, the server program 115 requests that the session manager 115a delete the session. The session manager 115a iterates through the session, invalidating and deleting objects in the session. The immediate deletion of the host objects immediately frees up memory allocated for the host objects without having to wait for the scheduled memory management mechanism (i.e., garbage collector 120b). Otherwise, memory that could be utilized immediately is tied up until the garbage collector 120b runs because the server program 115 has no knowledge of when the embedded script engine 120 no longer references a host object. This improves the overall usage of the program memory space 130 because the script engine memory space 140 is automatically managed by the garbage collector 120b, and the server program 115 manually manages the program memory space 130 when the session manager 115a deletes the host objects residing in the program memory space 130. When a hybrid programming environment relies only on a garbage collector 120b for memory management, there are significant peaks and valleys in memory collection. Using a session manager 115a to track objects and immediately delete host objects results in a more responsive memory system. The overall memory utilization is improved by using both the manual and garbage collected based memory management mechanisms.

In an example embodiment, when the server program 115 creates the session manager 115a, the method maintains the session manager 115a on the server program 115 as illustrated in FIG. 2. As noted above, the server program 115 has no knowledge of when the embedded script engine 120 no longer references a host object 130a. The session manager 115a is maintained on the server program 115, and maintains the list of host objects and script objects associated with a script. The session manager 115a then manually deletes objects in the program memory space 130 when the script finishes executing or terminates.

In an example embodiment, when the session manager 115a creates the session, during execution of the script, the session manager 115a may add a host object 130a (i.e., create a link to the host object 130a) and/or a script object 140a6 to the session. The session manager 115a may also maintain, within the session, reference links between a script object 140a6 and a host object 130a. For example, during execution of a script, the server program 115 may create host objects, and script objects. The server program 115 may also link a script object 140a6 to a host object 130a. Either of the server program 115 and the session manager 115a may push host objects and/or script objects onto the session. In an example embodiment, the session manager 115a maintains separate links to the script object 140a6 and the host object 130a. In another example embodiment, the script engine 120 creates and maintains the link between the script objects and host objects. The script engine 120 needs to know what host object 140a6 a script object 130a points to and/or references. The session also maintains that information so that the method knows which host objects to delete and what script objects to invalidate when a session ends.

In an example embodiment, when the session manager 115a creates the session, the session manager 115a maintains a hierarchy of sessions. For example, when the script executes and invokes another script, a sub session is created for objects associated with the other script. The session manager 115a then maintains the sub session within the session. In another example embodiment, the session manager 115a creates an application session for the objects created during the lifecycle of the server program 115, and those objects are pushed onto the application session. When the program server 115 instructs the embedded script engine 120 to execute a script, the session manager 115a creates a script session, and objects that are created during the execution of the script are pushed onto the script session.

In an example embodiment, when the session manager 115a creates the session, the server program 115 may add host objects and/or script objects to the session. Both the server program 115 and the session manager 115a may push host objects and/or script objects onto the session.

In an example embodiment, when the session manager 115a creates the session, the session is maintained in a session data structure 130b residing on the program memory space 130. As illustrated in FIG. 2 and FIG. 3, the session manager 115a resides on the server program 115, and the session data structure 130b resides on the program memory space 130. As illustrated in FIG. 3, the session data structure 130b contain host objects (for example host object 130a) and script objects (for example script object 140a6), along with reference links 130c that, for example, link script object 140a6 to host object 130a.

In an example embodiment, when the method receives notification of completion or termination of execution of the script, the session manager 115a iterates through the session to sequentially delete objects from that session. As the session manager 115a iterates through the session, the session manager 115a may remove reference links between a script object 140a6 and a host object 130a. The session manager 115a may then invalidate the script object 140a6, and mark the script object 140a6 as eligible for the scheduled memory management mechanism (i.e., the garbage collector 120b). The session manager 115a may then immediately delete the host object 130a, releasing the memory associated with the host object 130a. The session manager 115a then deletes host objects and script objects from the session. The session manager 115a immediately deletes the host object 130a to free up memory allocated for the host object 130a. In an example embodiment, the host object 130a is C++ code, and may be very large. The script code may be JavaScript, and may be a much smaller piece of code. Thus, immediate deletion of the host object 130a improves the overall memory usage utilization and increases scalability. The session manager 115a also alleviates stalls that could be caused by the scheduled memory management mechanism (i.e., the garbage collector 120b) due to lengthy scanning of excessive objects in the script object retaining tree 140a because the session manager 115a timely invalidates the script objects when the session ends. The script object 140a6 can wait for the scheduled memory management mechanism (i.e., the garbage collector 120b) because less space is typically allocated for the script object 140a6.

In an example embodiment, when the method receives notification of completion or termination of execution of the script, the session manager 115a sequentially deletes objects associated with the session and/or any sub sessions associated with the session. The sub session is created for objects associated with at least one other script invoked by the script, where the session manager 115a maintains the sub session within the session.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of using a session manager to improve memory management efficiency in a hybrid programming environment including both statically typed and dynamically typed programming languages, the computer-implemented method comprising:

receiving, by a server program having an embedded script engine, a request to execute a script, whereupon the server program instructs the embedded script engine to execute the script, wherein the script is composed in a dynamically typed programming language that features automatic memory management provided by the embedded script engine, wherein the server program is developed using a statically typed programming language that does not feature any automatic memory management;

creating, by the server program, the session manager, which is configured to provide manual memory management to manage objects associated with the execution of the script, wherein the objects are comprised of host objects and script objects, wherein the host objects reside in a program memory space, wherein the script objects reside in an embedded script engine memory space;

creating, by the session manager, a session associated with the execution of the script, wherein objects created during the execution of the script are associated with the session; and upon receiving notification of at least one of completion and termination of the execution of the script, requesting, by one or more computer processors when executing the server program, at least one of invalidation and deletion of the objects associated with the session, wherein deletion of host objects causes the manual memory management of the session manager to release memory in the program memory space without awaiting the automatic memory management of the embedded script engine, thereby improving memory management efficiency in the hybrid programming environment relative to relying on the automatic memory management of the embedded script engine in an absence of the manual memory management of the session manager.

2. The method of claim 1, wherein creating, by the server program, the session manager to manage objects associated with the execution of the script, wherein the objects are comprised of host objects and script objects, wherein the host objects reside in the program memory space, and the script objects reside in the embedded script engine memory space comprises:
   maintaining the session manager on the server program.

3. The method of claim 1, wherein creating, by the session manager, the session associated with the execution of the script, wherein objects created during the execution of the script are associated with the session comprises:
   maintaining, by the session manager, a hierarchy of sessions when the execution of the script invokes at least one other script, wherein a sub session is created for objects associated with the at least one other script, wherein the session manager maintains the sub session within the session.

4. The method of claim 1, wherein creating, by the session manager, the session associated with the execution of the script, wherein objects created during the execution of the script are associated with the session comprises:
   adding, by the server program, at least one of a host object and a script object to the session.

5. The method of claim 1, wherein creating, by the session manager, the session associated with the execution of the script, wherein objects created during the execution of the script are associated with the session comprises:
   maintaining the session in a session data structure residing on the program memory space.

6. The method of claim 1, wherein upon receiving notification of at least one of completion and termination of the execution of the script, requesting, by the server program, at least one of invalidation and deletion of the objects associated with the session comprises:
   sequentially deleting the objects associated with at least one of:
   i) the session; and
   ii) a sub session associated with the session wherein the sub session is created for objects associated with at least one other script invoked by the script, wherein the session manager maintains the sub session within the session.

7. The computer-implemented method of claim 1, wherein creating, by the server program, the session manager to manage objects associated with the execution of the script, wherein the objects are comprised of host objects and script objects, wherein the session manager is configured to maintain the script objects in a predefined data structure, wherein the predefined data structure comprises a script object retaining tree, wherein the host objects reside in the program memory space, and the script objects reside in the embedded script engine memory space comprises:
   maintaining the session manager on the server program.

8. The computer-implemented method of claim 7, wherein creating, by the session manager, the session associated with the execution of the script, wherein objects created during the execution of the script are associated with the session comprises:
   in respective instances during execution of the script, performing, by the session manager, each of:
   i) adding a host object to the session;
   ii) adding a script object to the session; and
   iii) maintaining, in the session, a reference link between the script object and the host object.

9. The computer-implemented method of claim 8, wherein creating, by the session manager, the session associated with the execution of the script, wherein objects created during the execution of the script are associated with the session comprises:
   maintaining, by the session manager, a hierarchy of sessions when the execution of the script invokes at least one other script, wherein a sub session is created for objects associated with the at least one other script, wherein the session manager maintains the sub session within the session.

10. The computer-implemented method of claim 9, wherein creating, by the session manager, the session associated with the execution of the script, wherein objects created during the execution of the script are associated with the session comprises, in respective instances, each of:
    i) adding, by the server program, at least one of a host object and a script object to the session,
    ii) maintaining the session in a session data structure residing on the program memory space.

11. The computer-implemented method of claim 10, wherein in a first set of instances, upon receiving notification of at least one of completion and termination of the execution of the script, requesting, by the server program, at least one of invalidation and deletion of the objects associated with the session comprises:
    iterating, by the session manager, through the objects associated with the session to perform, in respective instances, each of:
    i) removing a reference link from a script object to a host object;
    ii) invalidating the script object, and marking the script object as eligible for the scheduled memory management mechanism;
    iii) immediately deleting the host object;
    iv) removing the script object from the session; and
    v) removing the host object from the session.

12. The computer-implemented method of claim 11, wherein in a second set of instances, upon receiving notification of at least one of completion and termination of the execution of the script, requesting, by the server program, at least one of invalidation and deletion of the objects associated with the session comprises sequentially deleting, in respective instances, the objects associated with each of:
    i) the session; and
    ii) a sub session associated with the session wherein the sub session is created for objects associated with at least one other script invoked by the script, wherein the session manager maintains the sub session within the session.

13. A computer program product to use a session manager to improve memory management efficiency in a hybrid programming environment including both statically typed and dynamically typed programming languages, the computer program product comprising:

a computer readable storage medium having computer readable program code of a server program embodied therewith, the server program having an embedded script engine, the program code executable by one or more computer processors to:

receive, by the server program, a request to execute a script, whereupon the server program instructs the embedded script engine to execute the script, wherein the script is composed in a dynamically typed programming language that features automatic memory management provided by the embedded script engine, wherein the server program is developed using a statically typed programming language that does not feature any automatic memory management;

create, by the server program, the session manager, which is configured to provide manual memory management to manage objects associated with the execution of the script, wherein the objects are comprised of host objects and script objects, wherein the host objects reside in a program memory space, wherein the script objects reside in an embedded script engine memory space;

create, by the session manager, a session associated with the execution of the script, wherein objects created during the execution of the script are associated with the session; and upon receiving notification of at least one of completion and termination of the execution of the script, request, by the server program, at least one of invalidation and deletion of the objects associated with the session, wherein deletion of host objects causes the manual memory management of the session manager to release memory in the program memory space without awaiting the automatic memory management of the embedded script engine, thereby improving memory management efficiency in the hybrid programming environment relative to relying on the automatic memory management of the embedded script engine in an absence of the manual memory management of the session manager.

14. The computer program product of claim 13, wherein the computer readable program code configured to create, by the server program, the session manager to manage objects associated with the execution of the script, wherein the objects are comprised of host objects and script objects, wherein the host objects reside in the program memory space, and the script objects reside in the embedded script engine memory space is further configured to:

maintain the session manager on the server program.

15. The computer program product of claim 13, wherein the computer readable program code configured to create, by the session manager, the session associated with the execution of the script, wherein objects created during the execution of the script are associated with the session is further configured to:

maintain, by the session manager, a hierarchy of sessions when the execution of the script invokes at least one other script, wherein a sub session is created for objects associated with the at least one other script, wherein the session manager maintains the sub session within the session.

16. The computer program product of claim 13, wherein the computer readable program code configured to create, by the session manager, the session associated with the execution of the script, wherein objects created during the execution of the script are associated with the session is further configured to:

add, by the server program, at least one of a host object and a script object to the session.

17. The computer program product of claim 13, wherein the computer readable program code configured to create, by the session manager, the session associated with the execution of the script, wherein objects created during the execution of the script are associated with the session is further configured to:

maintain the session in a session data structure residing on the program memory space.

18. A system of using a session manager to improve memory management efficiency in a hybrid programming environment including both statically typed and dynamically typed programming languages, the system comprising:

one or more computer processors; and a computer readable storage medium operationally coupled to the processor, the computer readable storage medium having computer readable program code of a server program embodied therewith to be executed by the one or more computer processors, the server program having an embedded script engine, the computer readable program code configured to:

receive, by the server program, a request to execute a script, whereupon the server program instructs the embedded script engine to execute the script, wherein the script is composed in a dynamically typed programming language that features automatic memory management provided by the embedded script engine, wherein the server program is developed using a statically typed programming language that does not feature any automatic memory management;

create, by the server program, the session manager, which is configured to provide manual memory management to manage objects associated with the execution of the script, wherein the objects are comprised of host objects and script objects, wherein the host objects reside in a program memory space, wherein the script objects reside in an embedded script engine memory space;

create, by the session manager, a session associated with the execution of the script, wherein objects created during the execution of the script are associated with the session; and upon receiving notification of at least one of completion and termination of the execution of the script, request, by the server program, at least one of invalidation and deletion of the objects associated with the session, wherein deletion of host objects causes the manual memory management of the session manager to release memory in the program memory space without awaiting the automatic memory management of the embedded script engine, thereby improving memory management efficiency in the hybrid programming environment relative to relying on the automatic memory management of the embedded script engine in an absence of the manual memory management of the session manager.

19. The system of claim 18, wherein the computer readable program code configured to create, by the server program, the session manager to manage objects associated with the execution of the script, wherein the objects are comprised of host objects and script objects, wherein the host objects reside in the program memory space, and the script objects reside in the embedded script engine memory space is further configured to:
  maintain the session manager on the server program.

20. The system of claim 18, wherein the computer readable program code configured to create, by the session manager, the session associated with the execution of the script, wherein objects created during the execution of the script are associated with the session is further configured to:
  maintain, by the session manager, a hierarchy of sessions when the execution of the script invokes at least one other script, wherein a sub session is created for objects associated with the at least one other script, wherein the session manager maintains the sub session within the session.

* * * * *